United States Patent
Ito et al.

(10) Patent No.: US 9,085,690 B2
(45) Date of Patent: Jul. 21, 2015

(54) RESIN COMPOSITION AND SLIDING MEMBER USING SAME

(71) Applicant: KABUSHIKI KAISHA RIKEN, Chiyoda-ku, Tokyo (JP)

(72) Inventors: Hiroshi Ito, Kashiwazaki (JP); Akihiro Oowada, Kumagaya (JP); Mika Saito, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/237,826

(22) PCT Filed: Sep. 26, 2012

(86) PCT No.: PCT/JP2012/074806
§ 371 (c)(1),
(2) Date: Feb. 7, 2014

(87) PCT Pub. No.: WO2013/047625
PCT Pub. Date: Apr. 4, 2013

(65) Prior Publication Data
US 2014/0187721 A1    Jul. 3, 2014

(30) Foreign Application Priority Data
Sep. 28, 2011  (JP) .................. 2011-213563

(51) Int. Cl.
C08F 2/08       (2006.01)
C08F 214/06     (2006.01)
B32B 27/00      (2006.01)
B32B 5/16       (2006.01)
B05D 1/36       (2006.01)
F16C 33/10      (2006.01)
(Continued)

(52) U.S. Cl.
CPC .................. C08L 61/16 (2013.01); C08L 27/18 (2013.01); C08L 101/00 (2013.01)

(58) Field of Classification Search
CPC ........ C08L 27/18; C08L 101/00; C08L 61/16
USPC ............. 428/422, 327; 427/385, 409; 384/13; 524/850, 851
See application file for complete search history.

(56) References Cited

U.S. PATENT DOCUMENTS 6,005,025 A         12/1999   Bhatia et al.
2012/0251020 A1*    10/2012   Swei .............................. 384/13

FOREIGN PATENT DOCUMENTS

DE    10259380 A1    7/2003
EP     1548067 A1    6/2005
(Continued)

*Primary Examiner* — William Cheung
(74) *Attorney, Agent, or Firm* — Lowe Hauptman & Ham, LLP

(57) ABSTRACT

[Problem]
To provide a resin composition having excellent sliding properties and mechanical properties and a sliding member that uses the same.
[Solution]
According to a resin composition of a fluorine-based resin dispersed in a hard resin, the maximum particle size of the fluorine-based resin is adjusted to be no greater than 950 nm and the mean particle size is adjusted to 100 nm to 450 nm. The hard resin is preferably at least one type selected from among polyether ether ketone, polyphenylene sulfide, polybutylene terephthalate, polyamides, polyamideimides, vinylidene fluoride and liquid crystal polymers. Polytetrafluoroethylene is preferred as the fluorine-based resin.

8 Claims, 3 Drawing Sheets

(51) Int. Cl.
*C08L 61/16* (2006.01)
*C08L 27/18* (2006.01)
*C08L 101/00* (2006.01)

(56) References Cited

FOREIGN PATENT DOCUMENTS

| | | | |
|---|---|---|---|
| JP | 7145511 | A | 6/1995 |
| JP | 892487 | A | 4/1996 |
| JP | 8113711 | A | 5/1996 |
| JP | 1061777 | A | 3/1998 |
| JP | 2952294 | B2 | 9/1999 |
| JP | 2000240666 | A | 9/2000 |
| JP | 2000297220 | A | 10/2000 |
| JP | 200968390 | A | 4/2009 |
| JP | 2009286956 | A | 12/2009 |
| KR | 10-1999-0022809 | A | 3/1999 |

* cited by examiner

RESIN COMPOSITION AND SLIDING MEMBER USING SAME

RELATED APPLICATIONS

The present application is a National Phase of International Application Number PCT/JP2012/074806, filed Sep. 26, 2012, and claims priority from, Japanese Application Number 2011-213563, filed Sep. 28, 2011.

TECHNICAL FIELD

The present invention relates to a resin composition and to a sliding member using it, and more specifically, it relates to a resin composition having dispersed therein a fluorine-based resin such as polytetrafluoroethylene (hereunder, "PTFE"), and to a sliding member using the same.

BACKGROUND ART

Materials that have been conventionally used for sliding members include compositions in which solid lubricant materials such as PTFE or graphite and fibrous reinforcing materials such as carbon fibers or glass fibers are added to synthetic resins such as polyimides (hereunder, "PI"), polyether ether ketones (hereunder, "PEEK"), polyamideimides (hereunder, "PAI") and polyphenylene sulfides (hereunder, "PPS"). In such resin compositions, addition of a solid lubricant material lowers the frictional coefficient while addition of a fibrous reinforcing material increases the wear resistance, the mechanical strength and the creep resistance, so that a material with excellent sliding properties and mechanical properties is obtained. In recent years, however, with increasing market demands for higher energy efficiency and lower fuel consumption, there is a strong need for reduction in drag torque (the frictional coefficient $\mu$) on sliding parts such as seal rings, in particular. Even when a large amount of a fluorine-based resin such as PTFE is added in order to further improve the sliding properties, a sufficient lubricating effect is not obtained and the mechanical strength, including high-temperature rigidity, is reduced. On the other hand, when the fibrous reinforcing material is increased to further improve the mechanical strength, problems occur such as damage to counterpart materials. Therefore, numerous types of resin compositions have been proposed with the aim of improving the sliding properties and mechanical properties.

For example, Patent Literature 1 proposes a sliding member composition comprising 0.25 to 10 vol % of one or more types of inorganic oxide fine particles with a Moh's hardness (former) of 2.5 to 7 and a particle size of 0.1 to 30 μm; 3 to 30 vol % of a solid lubricant material; and the remainder of a synthetic resin. Such a composition also containing an aromatic polyamide fiber added to 0 to 30 vol % is also mentioned. In Patent Literature 1, it is stated that excellent wear resistance and a low frictional coefficient are obtained by filling with a specified amount of inorganic oxide fine particles with a hardness in a specified range and particle size in a specified range, in addition to a solid lubricant material.

Also, Patent Literature 2 discloses a polyether ketone-based resin composition with addition of 10 to 90 parts by weight of a copolymer of 3,3,3-trifluoro-2-trifluoromethyl-propene and 1,1-difluoroethylene with respect to 100 parts by weight of a polyether ketone resin. It is stated that the composition of Patent Literature 2 has excellent non-adhesiveness, without impairment of the inherent mechanical, thermal and electrical properties of the polyether ketone resin, and also exhibits very desirable sliding properties, and is thus optimal as a sliding member to be used at high temperatures.

However, with the resin composition for a sliding member according to Patent Literature 1, fine particles of an inorganic oxide such as a metal oxide are an essential component, and therefore the extent of wear of counterpart materials can potentially increase. Furthermore, addition of a high density metal oxide generally increases the specific gravity, impairing the lightweight advantage of the resin material.

On the other hand, addition of a low-molecular-weight fluorine-containing compound such as in Patent Literature 2 may be expected to improve dispersibility and enhance the physical properties of the material. However, using such a low-molecular-weight fluorine-containing compound can result in phase separation after mixing and lower heat resistance, and under harsh conditions it may not be possible to exhibit sufficient sliding properties.

CITATION LIST

Patent Literature

Patent Literature 1: Japanese Unexamined Patent Application Publication No. 8-92487
Patent Literature 2: Japanese Patent Publication No. 2952294

SUMMARY OF INVENTION

Technical Problem

The present invention has been devised in light of these circumstances, and its object is to provide a resin composition with excellent sliding properties and mechanical properties and a sliding member using the same.

Solution to Problem

As a result of diligent research directed toward this object, the present inventors have found that in a resin composition having a fluorine-based resin dispersed in a hard resin, limiting the maximum particle size of the fluorine-based resin to no greater than 950 nm, and the mean particle size to the range of 100 nm to 450 nm, improves the mechanical properties of the resin composition while also significantly lowering the frictional coefficient in oil, such that a sliding member composed of the resin composition can exhibit excellent mechanical properties and sliding properties, and the present invention has been completed upon this finding. In other words, the resin composition of the invention is a resin composition in which a fluorine-based resin is dispersed in a hard resin, wherein the maximum particle size of the fluorine-based resin is no greater than 950 nm, and the mean particle size is 100 nm to 450 nm.

Advantageous Effects of Invention

With a sliding member composed of a resin composition of the invention in which the maximum particle size of the fluorine-based resin dispersed in a hard resin is no greater than 950 nm and the mean particle size is 100 nm to 450 nm, the fine fluorine-based resin particles are evenly dispersed on the surface of the member. Thus, even when the oil film has been partially interrupted during sliding in oil, the presence of the fine fluorine-based resin particles between the counterpart material drastically lowers the friction resistance and results in excellent sliding properties. Also, with a resin composition of the invention, which has fluorine-based resin particles uniformly dispersed and contains no aggregated particles, excellent mechanical properties such as elastic modulus and tensile strength are exhibited. In addition, fluorine-based resin particles prepared in the range specified above do not undergo reaggregation even under high-temperature sliding conditions, and excellent sliding properties and mechanical properties can be maintained for prolonged periods. Furthermore, when the resin composition of the invention contains an added inorganic filler such as carbon fibers, the fine fluorine-based resin becomes selectively distributed in the periphery of the inorganic filler, and the inorganic filler adopts a structure which is covered with a fluorine-based resin particle layer. The fluorine-based resin particle layer also functions as an adhesive phase between the hard resin matrix and the inorganic filler. Thus, shedding of the inorganic filler is prevented even under heavy load conditions, so that excellent wear resistance can be maintained, and damage to counterpart materials by fallen portions of the inorganic filler is minimized.

DESCRIPTION OF EMBODIMENTS

Figure 1:
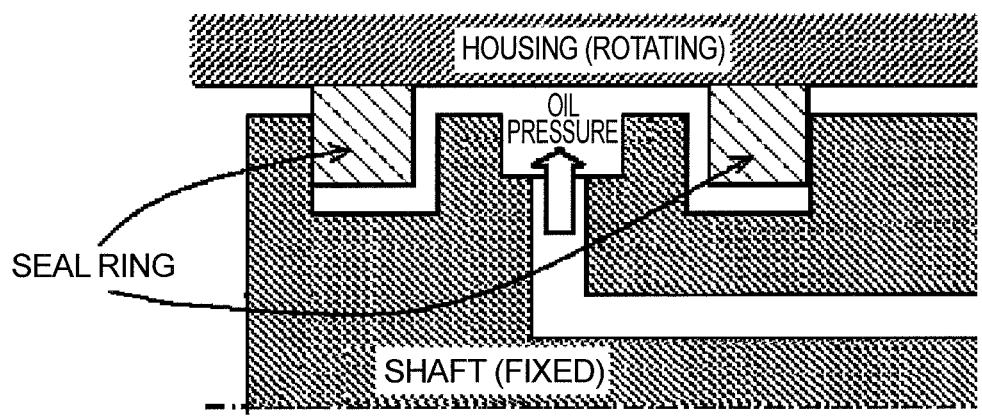
FIG. 1 is a schematic diagram showing an apparatus for measuring friction.

The seal ring of the invention will now be explained in greater detail.

In the resin composition of the invention, a fluorine-based resin is dispersed in a hard resin. According to the invention, the hard resin may be polyethylene terephthalate (PET), polybutylene terephthalate (PBT), polytrimethylene terephthalate (PTT), polyethylene naphthalate (PEN), polyester, polypropylene (PP) syndiotactic polystyrene resin, polyoxymethylene (POM), polyamide (PA), polycarbonate (PC), polyphenylene ether (PPE), polyphenylene sulfide (PPS), polyimide (PI), polyamideimide (PAI), polyetherimide (PEI), polysulfone (PSU), polyethersulfone, polyketone (PK), polyether ketone (PEK), polyether ether ketone (PEEK), polyether ketone ketone (PEKK), polyallylate (PAR), polyether nitrile (PEN), vinylidene fluoride (PVDF), a liquid crystal polymer (LCP), or the like. These resins may be copolymers, modified forms thereof, or mixtures of two or more. From the viewpoint of heat resistance and moldability, PBT, PA, PPS, PEEK and PVDF are preferred among the aforementioned hard resins. The hard resin is preferably a material with a melting point similar to the fluorine-based resin, and the difference in their melting points is preferably within 50° C. and even more preferably within 20° C. When PTFE (melting point: 327° C.) is used as the fluorine-based resin, it is preferred to use PEEK, PPS, PAI, LCP, or the PA compound polyphthalamide (PPA) or PA46. PAI does not have a melting point, but it is preferred because its molding temperature is 300 to 370° C. Also, according to the invention, the fluorine-based resin powder to be dispersed in the hard resin may be, in addition to PTFE, tetrafluoroethylene-perfluoroalkylvinyl ether copolymer (PFA), tetrafluoroethylene-hexafluoropropylene copolymer (FEP), tetrafluoroethylene-ethylene copolymer (ETFE), polychlorotrifluoroethylene (PCTFE), or the like. If the hard resin is a material other than PVDF, PVDF may be used as the fluorine-based resin. A fluorine-based elastomer or fluorine rubber may also be used. Commercial fluorine-based elastomer products include KALREZ by DuPont Corp. and DAI-EL THERMOPLASTIC by Daikin Industries, Ltd., and commercial fluorine rubber products include DAI-EL by Daikin Industries, Ltd.

To the resin composition of the invention there may also be added, in addition to the hard resin and fluorine-based resin, also a fibrous inorganic filler such as carbon fiber, glass fiber, alumina fiber, potassium titanate fiber, boron fiber or silicon carbide fiber, as an inorganic filler, in a range that does not interfere with the sliding properties. Addition of a fibrous inorganic filler can further improve the wear resistance, the mechanical strength and the creep resistance of sliding members obtained from the resin composition, allowing use with even higher PV value ranges. Among these fibrous inorganic fillers carbon fibers and glass fibers are preferred, PAN-based carbon fibers and pitch-based carbon fibers are more preferred as carbon fiber. The mean fiber lengths of these fibrous inorganic fillers are preferably 50 μm to 500 μm and more preferably 100 to 300 μm.

Also, carbon nanotubes not only function as a fibrous inorganic filler exhibiting a reinforcing function, but are also effective as a filler for improving the sliding properties.

According to the invention, another particulate filler may also be added, either instead of the fibrous inorganic filler or together with the fibrous inorganic filler, in order to improve the wear resistance or the sliding properties. Other fillers are preferably neutral materials with excellent heat resistance, which include, specifically, talc, graphite, boron nitride and the like.

According to the invention, the maximum particle size of the fluorine-based resin to be dispersed in the hard resin is adjusted to no greater than 950 nm and the mean particle size is adjusted to 100 nm to 450 nm. By specifying this range for the particle size of the fluorine-based resin to be dispersed in the hard resin it is possible to notably improve the mechanical properties and the sliding properties of the resin composition. When a fluorine-based resin with a maximum particle size exceeding 950 nm is present, the mechanical properties and sliding properties are drastically reduced. Also, if the mean particle size of the fluorine-based resin is less than 100 nm, it will not be possible to exhibit a sufficient solid lubrication function, and the frictional coefficient μ will tend to increase. If the mean particle size of the fluorine-based resin is greater than 450 nm, on the other hand, the frictional coefficient μ will tend to increase again. The mean value for the fluorine-based resin is preferably 150 nm to 350 nm. In this range, the frictional coefficient μ in oil will be further reduced.

The maximum particle size and mean particle size of the fluorine-based resin can be calculated by the following method, using a transmission electron microscope (TEM).

The observed portion of a test piece of a sliding member obtained from the resin composition is worked into a thin strip with a thickness of 100 nm, using a diamond knife. Upon confirming that the maximum particle size of the fluorine-based resin particles (the maximum length of the particles) is no greater than 950 nm in a TEM observational field range of 30 μm×100 μm at 23,000× magnification, the particle size of each fluorine-based resin particle (the maximum length of the particle) is measured. Three locations are observed for one sample, and the mean value for 10 particles in order from the largest is determined as the mean particle size. It can be judged whether or not each particle is a fluorine-based resin particle by confirming the peak intensity of fluorine using energy dispersive spectroscopy (EDS).

According to the invention, the fluorine-based resin preferably includes particles having an aspect ratio of 1.0 or greater and less than 1.1 and a roughly circular cross-section (first particles), and particles having an aspect ratio of 1.1 or greater and no greater than 3.5 and an elliptical cross-section (second particles). Combination of circular particles and elliptical particles in this manner strengthens the reinforcing effect and lubricating effect of both in a complementary manner, and more excellent mechanical properties and sliding properties are obtained. The area of the first particles is preferably 10 to 90 and more preferably 20 to 80, and where the area occupied by the fluorine-based resin in the resin composition is defined as 100.

The method of mixing the resin composition starting material of the invention is not particularly restricted so long as it is a method such that the fluorine-based resin particle size is within the aforementioned range, and preferably a Laboplastomil, twin-screw extruder or the like is used for mixing. In order to reliably accomplish fine uniform dispersion, it is preferred to accomplish mixing under high shear conditions, using a twin-screw extruder combined with a kneading disk that produces shear action on the screw axis. There may also be used a commercially available high shear molding machine. The particle size of the fluorine-based resin can be controlled by the shape and length of the screw, the screw rotation rate or the mixing time.

The resin composition of the invention is preferably used for a sliding member. Sliding members include bearings, guide members, chains, gears, thrust washers, seal rings and the like, but a particularly preferred application is to a seal ring to be mounted on a vehicle automatic transmission or the like. The resin composition of the invention may also be applied only to the sliding sections of the sliding member.

EXAMPLES

Although the invention will be further explained with the following examples, the invention is not limited to these examples.

Example 1

Using PEEK as a hard resin and PTFE as a fluorine-based resin, these were mixed with a twin-screw extruder having installed a ϕ92 mm screw which combined a lead and a kneading disk. The PEEK and PTFE were each supplied from a side feeder, and mixed under high shear conditions with a temperature of 370° C. and a screw rotational speed of 320 rpm, to obtain pellets. The diameters of the obtained pellets were approximately 3 mm, and the lengths were 3 to 4 mm. The PEEK and PTFE used were the commercial products identified below, the mass ratio (PEEK:PTFE) being 90:10.

The obtained pellets were injection molded to prepare different measuring samples. For measurement of the flexural modulus, a rectangular test piece (ISO178, 179, 80×10×4 mm) was fabricated. Also, for measurement of the frictional coefficient μ in oil and the extent of wear, there was fabricated a ring-shaped test piece having a special step abutment joint with a nominal diameter (outer diameter) of 50.0 mm, a width of 2.0 mm and a thickness of 2.0 mm. The die temperature during injection molding was 180° C., the molding temperature was 390° C. to 420° C., and the injection speed was 20 mm/sec. Also, the molding pressure was 140 MPa for the ring-shaped test piece, and 170 MPa for the rectangular test piece. The obtained ring-shaped test piece was used for measurement of the mean particle size of the PTFE particles by the method described above, and the flexural modulus, the frictional coefficient μ in oil and the extent of self-wear and the extent of counterpart material wear following a sliding test were measured, by the methods described below. The results are shown in Table 1 and FIG. 3 (frictional coefficient μ). The flexural modulus, the frictional coefficient μ and the extent of self-wear and the extent of counterpart material wear following the sliding test were expressed as relative values with 100 as the value for Comparative Example 3 described below.

Examples 2 to 5

Measuring samples were fabricated in the same manner as Example 1, except that the screw rotation rates of the twin-screw extruder were 300 rpm (Example 2), 280 rpm (Example 3), 240 rpm (Example 4) and 200 rpm (Example 5), respectively. The mean particle size of the PTFE particles, the flexural modulus, the frictional coefficient μ in oil and the extent of self-wear and the extent of counterpart material wear following a sliding test were measured, for each sample. The results are shown in Table 1 and FIG. 3 (frictional coefficient μ). The flexural modulus, the frictional coefficient μ and the extent of self-wear and the extent of counterpart material wear following the sliding test were expressed as relative values with 100 as the value for Comparative Example 3 described below.

Comparative Examples 1 to 3

Measuring samples were fabricated in the same manner as Example 1, except that the screw rotation rates of the twin-screw extruder were 350 rpm (Comparative Example 1), 180 rpm (Comparative Example 2) and 160 rpm (Comparative Example 3), respectively. The mean particle size of the PTFE particles, the flexural modulus, the frictional coefficient μ in oil and the extent of self-wear and the extent of counterpart material wear following a sliding test were measured, for each sample. The results are shown in Table 1 and FIG. 3

(frictional coefficient μ). The flexural modulus, the frictional coefficient μ and the extent of self-wear and the extent of counterpart material wear following the sliding test were expressed as relative values with 100 as the value for Comparative Example 3.

A. Hard resin
A-1. Polyether ether ketone: Victrex 150PF (product of Victrex plc)
B. Fluorine-based resin
B-1. Polytetrafluoroethylene: POLYFLON PTFE M-18F (product of Daikin Industries, Ltd.)
C. Filler
C-1. Carbon fibers: HT C413 (product of Toho Tenax Co., Ltd.)

(Measurement of Flexural Modulus)

The bending strength and bending strain were measured based on JIS K7171, and the flexural modulus was calculated.

(Measurement of Frictional Coefficient μ in Oil)

The ring-shaped test pieces of Examples 1 to 5 and Comparative Examples 1 to 3 were each mounted on a shaft groove formed on the peripheral surface of a shaft (made of S45C) provided with a hydraulic circuit, as shown in FIG. 1, and installed in a test apparatus. Next, a housing (made of S45C) was fitted thereon and rotated at a rotational speed of 1340 rpm (3.5 m/s), and the frictional coefficient μ in oil was calculated from the rotational torque loss detected from a torque detector mounted on the test apparatus. The oil used was ATF, and measurement was conducted with a contact pressure of 2.0 MPa.

(Measurement of Self-Wear and Counterpart Material Wear Following Sliding Test)

The ring-shaped test pieces of Examples 1 to 5 and Comparative Examples 1 to 3 were each mounted on a test apparatus as shown in FIG. 1. A pattern of raising the rotational speed from 0 to 1340 rpm (3.5 m/s) and the oil pressure from 0 to 2.0 MPa, conducting operation at 1340 rpm, 2.0 MPa for 2 hours, and then suspending operation for 15 minutes, was repeated for a period of 200 hours. After the test, the extent of wear of the ring, shaft and housing was measured.

Figure 2:
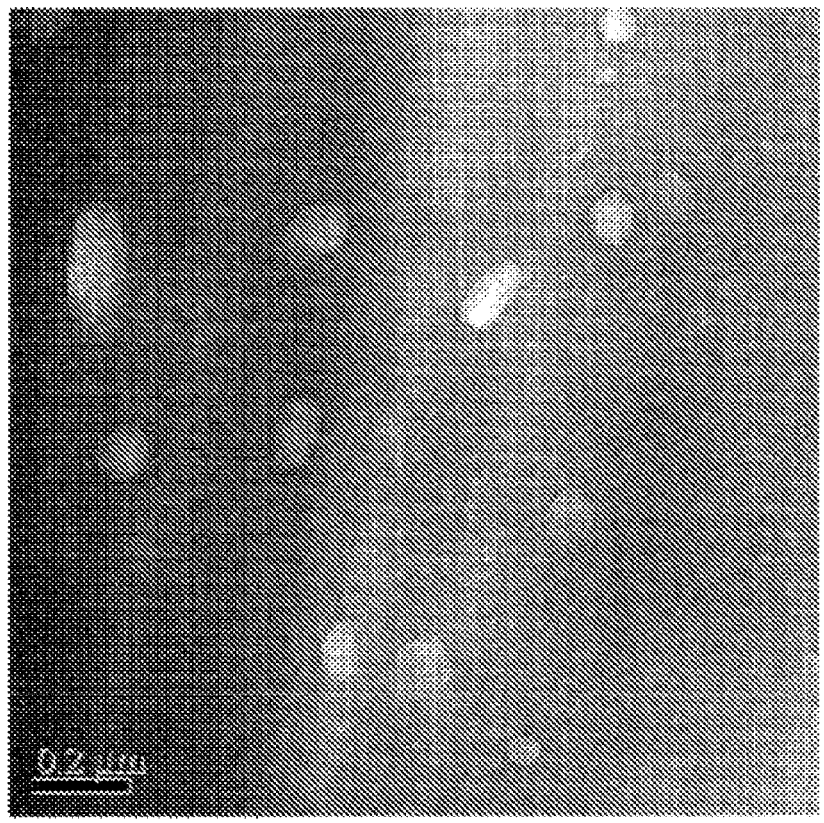
FIG. 2 is a TEM observation photograph (23,000×) of the sample of Example 2.

Table 1 shows that by changing the screw rotation rate of the twin-screw extruder, it is possible to control the particle size of the fluorine-based resin in the sliding member obtained from the resin composition. FIG. 2 shows a TEM observation photograph (magnification: 23,000×) of the sample of Example 2. The maximum length of the PTFE particles observed in FIG. 2 was approximately 340 nm, and particles with particle sizes (long diameters) of about 100 nm to 200 nm were uniformly dispersed. In the other examples as well, no particles with long diameters of 950 nm or larger were found, and dispersion of particles uniformly distributed around the mean particle size was confirmed. This demonstrated that a sliding member obtained from a resin composition of the invention notably improves the dispersibility of PTFE particles compared to a conventional sliding member in which PTFE aggregated particles with sizes of about several tens of micrometers are present.

In Examples 1 to 5 which had mean particle sizes of 120 to 440 nm, the flexural modulus increased by about 10% compared to Comparative Example 3 which had a mean particle size of 800 nm for the PTFE particles. The reason for this may be that the mean particle size of the PTFE particles was reduced and the specific surface area increased, thereby widening the area of contact with the PEEK that was serving as the matrix resin, resulting in integration of the materials and size reduction of the PTFE particles and thus making them less likely to become origin points for breakage. However, when the mean particle size of the PTFE particles was even smaller, below 100 nm, the effect of fine dispersion was not seen (Comparative Example 1). In the examples of the invention, the flexural modulus was 15 to 20% higher than a conventional sliding member which has PTFE aggregated particles with sizes of several tens of micrometers.

Figure 3:
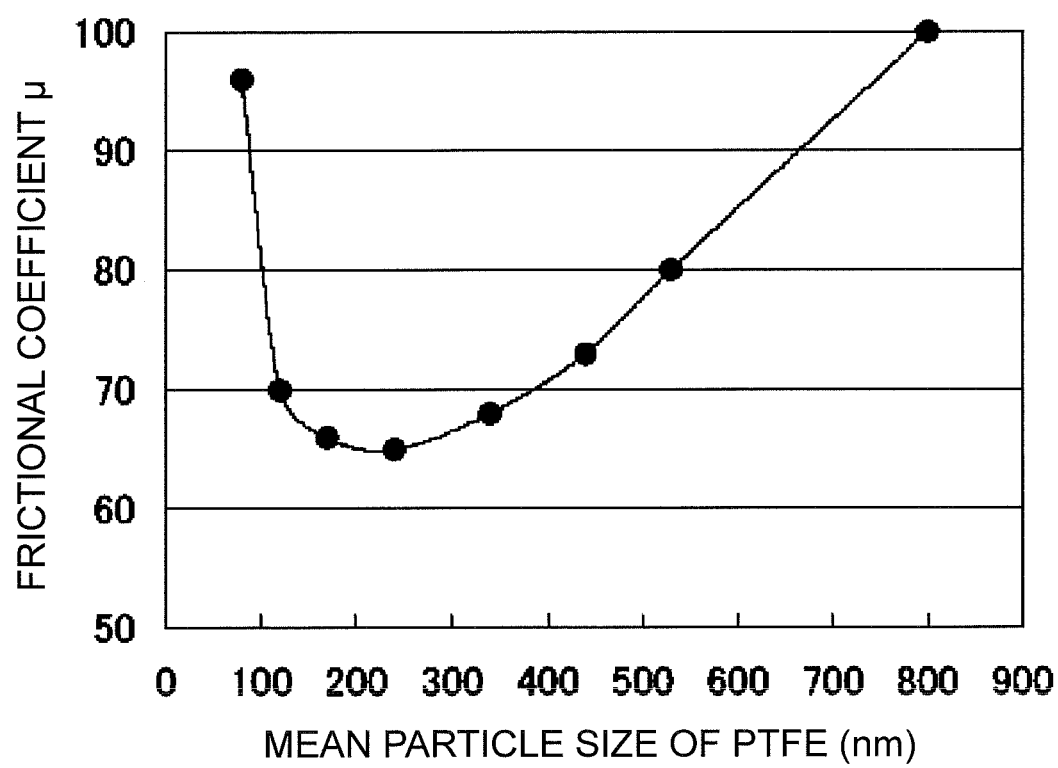
FIG. 3 is a graph showing the relationship between mean particle size of PTFE particles dispersed in a sliding member and frictional coefficient μ in oil.

FIG. 3 shows the results of plotting the mean particle sizes of the PTFE particles of the samples of Examples 1 to 5 and Comparative Examples 1 to 3, against frictional coefficient μ in oil. The values of the frictional coefficient μ on the ordinate are expressed as relative values with 100 as the frictional coefficient μ of Comparative Example 3. FIG. 3 shows a trend toward lower frictional coefficient μ in oil, when the mean particle size of the PTFE particles is 800 nm or smaller. When the mean particle size of the PTFE particle was less than 100 nm, however, the frictional coefficient μ in oil drastically increased. The frictional coefficient μ, in oil was a low value when the mean particle size of the PTFE particles was in the range of 100 to 450 nm, and an even lower value when it was in the range of 150 nm to 350 nm.

Table 1 shows that in Examples 1 to 5 in which the mean particle size of the PTFE particles was 120 to 440 nm, the extent of self-wear after the 200-hour sliding test was reduced by 15 to 25% compared to Comparative Example 3 in which the mean particle size of the PTFE particles was 800 nm. The reason for this may be that in Comparative Example 3 in which the mean particle size of the PTFE particles was 800 nm, the PTFE particles that were dispersed on the sliding member surface expanded due to the sliding heat, whereby sliding lubrication with the counterpart material was inhibited, while the difference in thermal expansion between the PEEK matrix resin and PTFE resulted in falling off of the PTFE particles from the matrix resin and a reduced lubricating effect. In contrast, in the examples of the invention, the PTFE particles that were dispersed on the surface facing the counterpart material were fine and uniform and were therefore almost unaffected by thermal expansion due to sliding heat, such that sliding lubrication with the counterpart material could be maintained, and because they were fine, there was resistance to falling off due to the difference in thermal expansion with the matrix resin, and therefore excellent sliding properties could be maintained. When the surfaces of the samples of Examples 1 to 5 were again observed by TEM after the sliding test, no aggregation was seen in the PTFE particles, and the particle sizes and particle shapes before the sliding test were found to be essentially maintained. This suggests that with a sliding member using a resin composition of the invention, excellent sliding properties and mechanical properties can be maintained even with prolonged operation. When the mean particle size of the PTFE particles was less than 100 nm there was a tendency toward a greater extent of self-wear, and a satisfactory lubricating effect was not obtained.

TABLE 1

|  | Screw rotation rate (rpm) | Mean particle size of PTFE particles (nm) | Flexural modulus | Sliding test | |
|---|---|---|---|---|---|
|  |  |  |  | Extent of self-wear | Extent of counterpart material wear |
| Example 1 | 320 | 120 | 107 | 84 | 91 |
| Example 2 | 300 | 170 | 109 | 80 | 92 |
| Example 3 | 280 | 240 | 110 | 77 | 94 |
| Example 4 | 240 | 340 | 113 | 74 | 95 |
| Example 5 | 200 | 440 | 109 | 81 | 93 |

TABLE 1-continued

|  | Screw rotation rate (rpm) | Mean particle size of PTFE particles (nm) | Flexural modulus | Sliding test | |
|---|---|---|---|---|---|
|  |  |  |  | Extent of self-wear | Extent of counterpart material wear |
| Comp. Ex. 1 | 350 | 80 | 97 | 103 | 87 |
| Comp. Ex. 2 | 180 | 530 | 102 | 97 | 96 |
| Comp. Ex. 3 | 160 | 800 | 100 | 100 | 100 |

Example 6

A measuring sample was fabricated in the same manner as Example 4, except that carbon fibers (CF) were supplied from a side feeder instead of PEEK and PTFE. Table 2 shows the results of measuring the mean particle size of the PTFE particles, the flexural modulus, the frictional coefficient μ in oil and the extent of self-wear and the extent of counterpart material wear following a sliding test, for the obtained sample. The PEEK, PTFE and carbon fibers (CF) used were the aforementioned commercial products, in a mass ratio (PEEK:PTFE:CF) of 70:10:20. The flexural modulus, the frictional coefficient μ in oil and the extent of self-wear and the extent of counterpart material wear following the sliding test were expressed as relative values with 100 as the value for Comparative Example 5 described below.

Comparative Examples 4 and 5

Measuring samples (Comparative Examples 4 and 5) were fabricated in the same manner as Comparative Example 1 and Comparative Example 3, respectively, except that carbon fibers (CF) were supplied from a side feeder instead of PEEK and PTFE. Table 2 shows the results of measuring the mean particle size of the PTFE particles, the flexural modulus, the frictional coefficient μ in oil and the extent of self-wear and the extent of counterpart material wear following a sliding test, for each sample. The mass ratio of PEEK, PTFE and CF (PEEK:PTFE:CF) was 70:10:20. The flexural modulus, the frictional coefficient μ in oil and the extent of self-wear and the extent of counterpart material wear following the sliding test were expressed as relative values with 100 as the value for Comparative Example 5.

In Example 6 and Comparative Examples 4 and 5, in which CF was added, it was confirmed that by changing the screw rotation rate of the twin-screw extruder, it is possible to control the particle size of the fluorine-based resin in the sliding member obtained from the resin composition. Also, since Example 6 had a higher flexural modulus and a lower frictional coefficient μ in oil than Comparative Examples 4 and 5, it was thereby confirmed that limiting the mean particle size of the fluorine-based resin to within the range specified by the invention also improves the sliding properties and mechanical properties for a CF-added resin composition. Furthermore, the effect of reducing the extent of self-wear and the extent of counterpart material wear after the sliding test was notable in Example 6, with reduction by about ½ being found compared to Comparative Examples 4 and 5. As a result of SEM observation of the surface of the sample in Example 6, it was found that the fine PTFE particles were distributed selectively around the CF, forming a structure with CF covered by a PTFE particle layer. It is also possible that, since a PTFE layer also functions as a bonding phase between the PEEK matrix and the CF, falling off of CF is prevented, excellent wear resistance can be maintained and damage to counterpart materials by fallen CF pieces is minimized, even under harsh sliding conditions, thereby reducing the extent of self-wear and the extent of counterpart material wear.

TABLE 2

|  | Screw rotation rate (rpm) | Mean particle size of PTFE particles (nm) | Flexural modulus | Frictional coefficient μ | Sliding test | |
|---|---|---|---|---|---|---|
|  |  |  |  |  | Extent of self-wear | Extent of counterpart material wear |
| Example 6 | 240 | 330 | 118 | 72 | 48 | 52 |
| Comp. Ex. 4 | 350 | 70 | 90 | 102 | 105 | 108 |
| Comp. Ex. 5 | 160 | 820 | 100 | 100 | 100 | 100 |

The invention claimed is:

1. A resin composition in which a fluorine-based resin is dispersed in a hard resin,
   wherein,
   the maximum particle size of the fluorine-based resin is no greater than 950 nm, and the mean particle size is 100 nm to 450 nm and,
   the fluorine-based resin includes first particles having an aspect ratio of 1.0 or greater and less than 1.1 and second particles having an aspect ratio of 1.1 or greater and no greater than 3.5, and where the area occupied by the fluorine-based resin in the resin composition is defined as 100, the area occupied by the first particles being 10 to 90.

2. A resin composition in which a fluorine-based resin is dispersed in a hard resin,
   wherein,
   the maximum particle size of the fluorine-based resin is no greater than 950 nm, and the mean particle size is 100 nm to 450 nm,
   the fluorine-based resin includes first particles having an aspect ratio of 1.0 or greater and less than 1.1 and second particles having an aspect ratio of 1.1 or greater and no greater than 3.5, and where the area occupied by the fluorine-based resin in the resin composition is defined as 100, the area occupied by the first particles being 10 to 90, and
   the hard resin is at least one type selected from among polyether ether ketones, polyphenylene sulfides, polybutylene terephthalates, polyamides, polyamideimides, vinylidene fluorides and liquid crystal polymers.

3. The resin composition according to claim 1, wherein the fluorine-based resin is polytetrafluoroethylene.

4. The resin composition according to claim 2, wherein the fluorine-based resin is polytetrafluoroethylene.

5. A sliding member having a sliding section comprising a resin composition according to claim 1.

6. A sliding member having a sliding section comprising a resin composition according to claim 2.

7. A sliding member having a sliding section comprising a resin composition according to claim 3.

8. A sliding member having a sliding section comprising a resin composition according to claim 4.

* * * * *